United States Patent [19]

Taber

[11] 4,168,731

[45] Sep. 25, 1979

[54] LOCKING NUT AND BOLT ASSEMBLY

[76] Inventor: Benjamin C. Taber, 8 Maynard St., Westboro, Mass. 01581

[21] Appl. No.: 839,816

[22] Filed: Oct. 6, 1977

[51] Int. Cl.² ............................................. F16B 39/32
[52] U.S. Cl. ....................................................... 151/11
[58] Field of Search ............... 151/9, 10, 11, 12, 14 R, 151/21 R, 21 B, 30

[56] References Cited

U.S. PATENT DOCUMENTS

| | | | |
|---|---|---|---|
| 1,227,310 | 5/1917 | Quick | 151/10 |
| 2,294,057 | 8/1942 | Thompson | 151/14 R |
| 2,381,352 | 8/1945 | Hotchkin | 151/14 R |
| 2,494,882 | 1/1950 | Kost | 151/21 C |
| 2,834,390 | 5/1958 | Stevens | 151/11 |

FOREIGN PATENT DOCUMENTS

| | | | |
|---|---|---|---|
| 1345897 | 11/1963 | France | 151/11 |
| 651270 | 3/1951 | United Kingdom | 151/30 |

Primary Examiner—Thomas J. Holko
Attorney, Agent, or Firm—Wolf, Greenfield & Sacks

[57] ABSTRACT

Disclosed is a nut having an internally threaded cylindrical inner wall portion joined at one end by a connecting portion to an outer wall portion and separated by an annular volume. The outer wall portion possesses resilient reentrant fingers located opposite the connecting portion and having terminations that project beyond the inner periphery of the inner wall portion. A bolt has external threads that mate with the internal threads of the inner wall portion and also engage and deform outwardly the terminations of the resilient fingers. Discontinuous locking recesses are disposed at spaced apart locations in the grooves of the external bolt threads. During engagement of the nut, the terminations of the resilient fingers spring into locking position within the locking recesses upon circumferential alignment therebetween and prevent reverse rotation of the nut.

7 Claims, 6 Drawing Figures

LOCKING NUT AND BOLT ASSEMBLY

BACKGROUND OF THE INVENTION

This invention relates generally to a self-locking nut and bolt assembly and, more particularly, to such an assembly in which the nut can be easily threaded onto the bolt in one direction but is highly resistant to rotation in the opposite direction.

Various lock nuts are known both commercially and in the patent literature. Most such lock nuts, however, are less than satisfactory in that they can become dislodged or loosened by various types of torsional, lateral and axial vibrations. Others are excessively expensive to produce, are cumbersome and complicated or are suitable for use in only specialized applications.

The object of this invention, therefore, is to provide a nut and bolt assembly in which the nut can be relatively easily tightened on the bolt and will reliably maintain any position thereon even when subjected to excessive vibrations and which is in addition relatively inexpensive to manufacture.

SUMMARY OF THE INVENTION

The present invention is characterized by a nut having an internally threaded cylindrical inner wall portion joined at one end by a connecting portion to an outer wall portion and separated therefrom by an annular volume. The outer wall portion possesses resilient reentrant fingers located opposite the connecting portion and having terminations that project beyond the inner periphery of the inner wall portion. A bolt has external threads that mate with the internal threads of the inner wall portion and also engage and deform outwardly the terminations of the resilient fingers. Discontinuous locking recesses are disposed at spaced apart locations in the grooves of the external bolt threads. During engagement of the nut, the terminations of the resilient fingers spring into locking position within the locking recesses upon circumferential alignment therebetween and prevent reverse rotation of the nut. Its shell-like structure permits stamping of the nut from sheet stock thereby providing at reasonable cost a nut having the desired resilient finger portions while the locking recesses provided in the bolt insure against loosening of the assembly in response to any type of vibration.

One feature of the invention is the provision in the bolt of locking recesses defined by an abutment surface extending substantially radially thereinto and a cam surface extending between the lowermost portion of the abutment surface and the bottom of the thread groove in which the recess is located. The abutment surface is disposed at an end of the recess first confronted by the terminations on the resilient fingers during engaging relative rotation between the nut and bolt. Reverse rotation is prevented by the abutment surfaces while engagement between the nut and bolt is facilitated by the cam surfaces that cam the resilient finger terminations out of the recesses during engaging relative rotation.

Another important feature of the invention is the provision on the nut of resilient finger terminations that correspond in shape to the locking recesses in the bolt. This arrangement insures full penetration of the finger terminations into the locking recesses and thereby enhances the locking effectiveness thereof. In one embodiment of the invention, the abutment surfaces of the locking recesses are substantially rectangular and the cam surfaces are substantially flat surfaces extending between the lowermost edge of the abutment surface and the bottom of the thread groove. In another embodiment, the abutment surfaces of the locking recesses are substantially triangular and the cam surfaces are defined by the intersections between two tapered surfaces with the cam surfaces extending between the apex of the triangular abutment surface and the bottom of the thread groove.

DESCRIPTION OF THE DRAWINGS

These and other features and objects of the present invention will become more apparent upon a perusal of the following description taken in conjunction with the accompanying drawings wherein.

DESCRIPTION OF THE PREFERRED EMBODIMENTS

Figure 1:
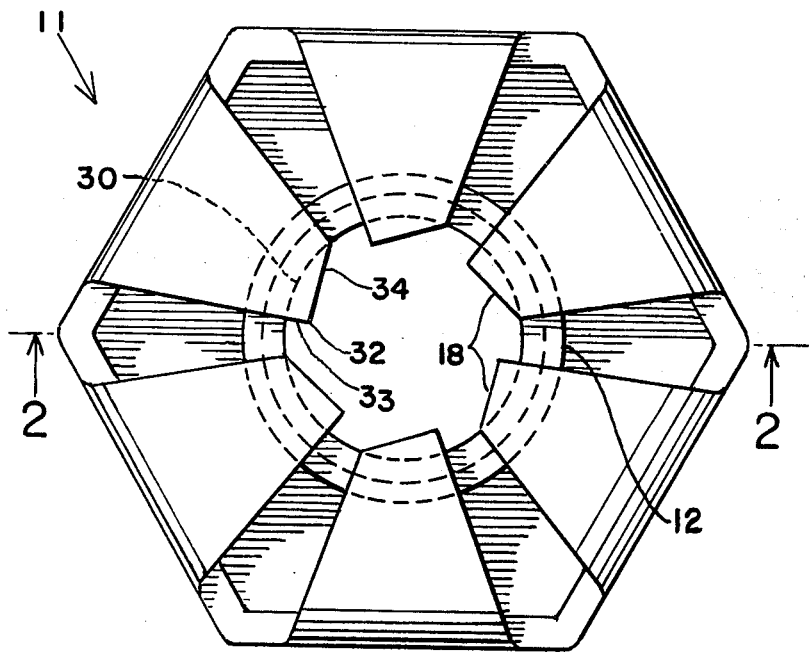
FIG. 1 is a plan view of a preferred nut according to the present invention.
Figure 2:
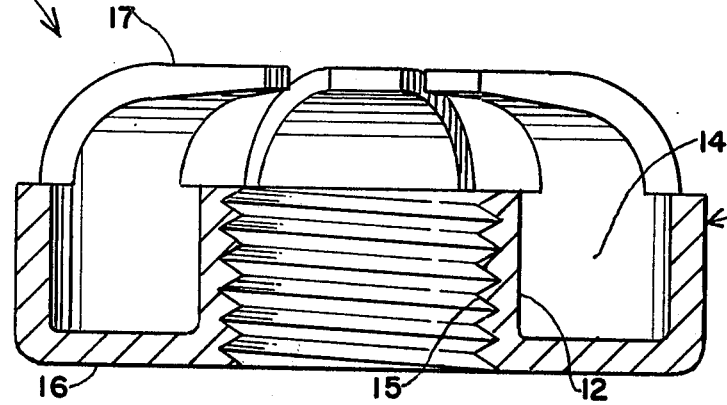
FIG. 2 is a cross-sectional drawing taken on lines 2—2 of FIG. 1.

Referring now to FIGS. 1 and 2 there is shown a nut 11, preferably stamped from sheet metal stock and then formed as shown. The nut 11 includes a cylindrical inner wall portion 12 separated from a hexagonally shaped outer wall portin 13 by an annular volume 14. Threads 15 are formed on the internal surface of inner wall portion 12 which is connected at one end to the outer wall portion 13 by a connecting portion 16. Extending from the end of the outer wall portion 13 opposite the connecting portion 16 are a plurality of uniformly spaced apart resilient finger portions 17 each having a reentrant terminal portion 18 that projects over and beyond the inner periphery of the cylindrical inner wall portion 12 as shown in FIG. 1. As shown in FIGS. 1 and 2, the terminal portions 18 have elongated edges which lie within and along an annular region concentric with the inner wall portion 12.

Figure 4:
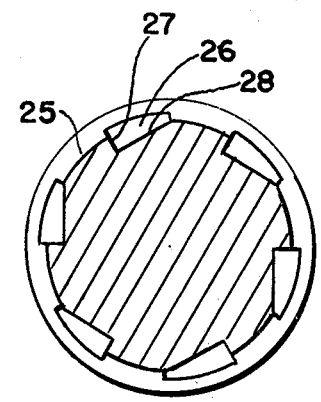
FIG. 4 is a cross-sectional view taken along lines 4—4 of FIG. 3.
Figure 3:
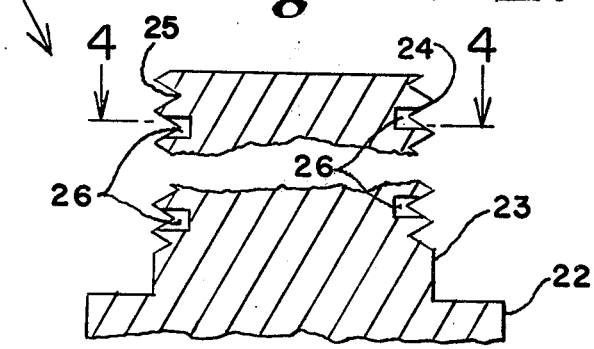
FIG. 3 is a partial cross-sectional view of a bolt for assembly with the nut shown in FIGS. 1 and 2.

Referring now to FIGS. 3 and 4 there is shown a bolt 21 having a head portion 22 and a shank portion 23. Formed on the shank 23 are helical threads 24 that mate with the internal threads 15 on the nut 11 shown in FIGS. 1 and 2. Locking recesses 26 extend from the helical groove 25 of the thread 24 into the shank portion 23. The locking recesses 26 are deeper than the thread grooves 25 and are evenly spaced therealong as shown in FIG. 4. Each locking recess 26 includes an abutment surface 27 that extends substantially radially into the shank portion 23 and a cam surface 28 that extends between the lowermost portion of the abutment surface 27 and the bottom of the thread groove 25 in which the recess is located.

Figure 5:
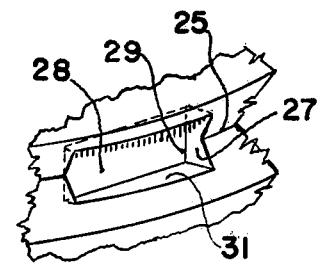
FIG. 5 is a perspective view showing in greater detail one of the recesses illustrated in the bolt shown in FIGS. 3 and 4.

In the perspective view of FIG. 5 it will be seen that the recesses 26 are formed in such a way that the cam surface 28 is a rectangularly shaped surface extending from the bottom edge 29 of the rectangularly shaped abutment surface 27 to the bottom of the thread groove 25. Thus, a cross section through a recess 26 perpendicular to both an abutment surface 27 and a cam surface 28 has a triangular shape as shown by the recess side wall 31 shown in FIG. 5. In preferred embodiments of the invention this cross-sectional form of the locking recesses corresponds to the shape of the terminal portions 18 on the resilient fingers 17 of the mating nut 11. Thus, as illustrated in FIG. 1, each terminal portion 18 is triangular in form with a curved base 30 following the inner periphery 15 of inner wall portion 12 and an apex 32 that extends beyond that periphery a distance corresponding to the depth of the abutment surfaces 27 of the recesses 26. Also, the spacing between the terminal portions 18 on the nut 11 preferably correspond to the spacing between the recesses 26 in the bolt 21.

The invention is used to secure separate elements together in the conventional manner by screwing the nut 11 onto the bolt 21. Six times during each revolution of the nut 11, a locking position is reached in which each of the terminal portions 18 project into an aligned recess 26 in the shank portion 23. In those positions a mating surface 33 extending between a base 30 and apex 32 of each terminal portion 18 engages an abutment surface 27 of an aligned recess 26 thereby preventing counter-relative rotation between the nut 11 and the bolt 21. In response to further engaging relative rotation, each of the terminal portions 18 are forced out of the recesses 26 by the caming action between the edges 34 of the terminal portions 18 and the caming surface 28. This caming action gradually deforms the resilient fingers 17 outwardly until the apices 32 of the terminal portions 18 rest against the bottom of the thread grooves 25 between the spaced apart recesses 26. When further rotation moves the apices 32 over the abutment edge 27 of the subsequent set of recesses 26, the terminal portions 18 again spring into the aligned recesses establishing a locking position that again prevents counter-relative rotation between the nut 11 and the bolt 21.

Figure 6:
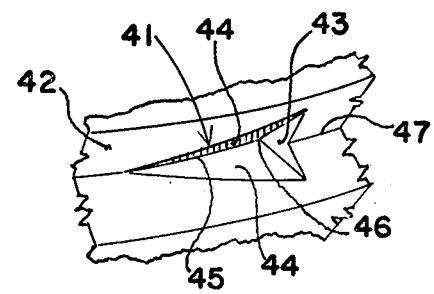
FIG. 6 is a partial perspective view illustrating another bolt embodiment with a modified form of recess.

FIG. 6 shows in perspective another preferred form of locking recess 41 for use in the present invention. Again, the recess 41 is one of a plurality of such recesses circumferentially spaced along a groove 42 of a conventional helical bolt thread. In this embodiment, the recess 41 includes a triangularly shaped abutment surface 43 extending substantially radially into a bolt and a pair of tapered triangular side surfaces 44. The intersection of the tapered surfaces 44 establishes a cam surface 45 that extends between the lower apex 46 of the abutment surface 43 and the bottom 47 of the thread groove 42.

As in the embodiment shown in FIG. 5, a cross section perpendicular to the abutment surface 43 and bisecting the recess 41 has a triangular shape that corresponds to the terminal portions 18 on the resilient fingers 17. Thus, as described above, the caming surface 45 permits relatively easy engaging relative rotation between the nut and bolt. Conversely, in each intermittent locking position therebetween, a relatively large area of contact is provided between the resilient mating finger surface 33 and the abutment surfaces 43 to thereby provide a strong resistance to counter rotation between the nut and bolt.

Obviously, many modifications and variations of the present invention are possible in light of the above teachings. For example only, specific forms of both resilient terminal portions and locking recesses and of numbers and distribution thereof other than those specifically shown can be employed. It is to be understood, therefore, that the invention can be practiced otherwise than as specifically described.

What is claimed is:

1. A nut and bolt combination comprising:

a nut formed by an annular shell comprising a cylindrical inner wall portion having internal threads and being separated from a continuous outer wall portion by an annular volume, said cylindrical inner wall portion being joined at one end to said outer wall portion by a connecting portion, said outer wall portion comprising resilient reentrant finger portions located at an end thereof opposite to said connecting portion, said finger portions extending across said cylindrical inner wall portion and having spaced apart terminal surface portions projecting beyond the inner periphery of said inner wall portion, said terminal portions having spaced-apart elongate edges which lie within and along an annular region concentric with said inner wall portion; and a bolt having external threads that mate with said internal threads on said inner wall portion so as to be engageable therewith, said spaced apart resilient terminal portions extending into the grooves of said external threads and being outwardly deformed thereby, said bolt comprises discontinuous locking recesses deeper than said grooves of said external threads and disposed at spaced apart locations therealong; each of said recesses being defined by a triangular abutment surface extending substantially radially into said bolt and a cam surface portion extending between a lowermost portion of said abutment surface and the bottom of said external thread groove, said cam surface portion being defined by the intersection between two tapered surfaces of said recess and extending between the apex of said triangular abutment surface and the bottom of said external thread groove and said abutment surface being disposed at an end of said recess first confronted by said terminal portions during engaging rotation between said nut and said bolt; and wherein during relative rotation between said bolt and said nut said terminal portions alternately and sequentially spring into locking position within said locking recesses upon circumferential alignment therebetween and are then cammed out of said recesses by said cam surfaces.

2. A nut and bolt combination according to claim 1 wherein said abutment surface is substantially rectangular and said cam surface is a substantially flat surface extending between the lowermost edge of said abutment surface and the bottom of said external thread groove.

3. A nut and bolt combination according to claim 1 wherein said terminal portions comprise locking edges that conform substantially in shape to said intersecting abutment and cam surfaces.

4. A nut and bolt combination according to claim 3 wherein said abutment surface is disposed at an end of said recess first confronted by said terminal portions during engaging relative rotation between said nut and said bolt.

5. A nut and bolt combination according to claim 4 wherein said abutment surface is substantially rectangular and said cam surface is a substantially flat surface extending between the lowermost edge of said abutment surface and the bottom of said external thread groove.

6. A nut and bolt combination according to claim 1 wherein said bolt includes a head portion at one end thereof.

7. A nut and bolt combination according to claim 1 wherein said annular volume has a hexogonal cross section.

* * * * *